(12) United States Patent
Nissan et al.

(10) Patent No.: US 9,418,152 B2
(45) Date of Patent: Aug. 16, 2016

(54) SYSTEM AND METHOD FOR FLEXIBLE SPEECH TO TEXT SEARCH MECHANISM

(75) Inventors: Maor Nissan, Herzliya (IL); Moshe Wasserblat, Maccabim (IL)

(73) Assignee: NICE-SYSTEMS LTD., Ra'anana (IL)

( * ) Notice: Subject to any disclaimer, the term of this patent is extended or adjusted under 35 U.S.C. 154(b) by 676 days.

(21) Appl. No.: 13/023,949

(22) Filed: Feb. 9, 2011

(65) Prior Publication Data

US 2012/0203776 A1 Aug. 9, 2012

(51) Int. Cl.
*G06F 17/30* (2006.01)
*G10L 15/08* (2006.01)

(52) U.S. Cl.
CPC .......... *G06F 17/30746* (2013.01); *G10L 15/08* (2013.01)

(58) Field of Classification Search
CPC ............ G06F 17/30654; G06F 17/277; G06F 17/30778; G06F 17/28; G06F 17/30746; G10L 15/08
USPC ......................................................... 707/728
See application file for complete search history.

(56) References Cited

U.S. PATENT DOCUMENTS

| | | | |
|---|---|---|---|
| 7,286,987 B2 | 10/2007 | Roy | |
| 2002/0052740 A1* | 5/2002 | Charlesworth et al. | 704/220 |
| 2002/0120448 A1* | 8/2002 | Garner et al. | 704/254 |
| 2004/0236580 A1* | 11/2004 | Bennett | 704/270.1 |
| 2005/0055210 A1* | 3/2005 | Venkataraman et al. | 704/255 |
| 2007/0233487 A1* | 10/2007 | Cohen et al. | 704/255 |
| 2008/0228485 A1* | 9/2008 | Owen | 704/254 |
| 2009/0052635 A1* | 2/2009 | Jones et al. | 379/88.02 |
| 2011/0106792 A1* | 5/2011 | Robertson | 707/723 |

OTHER PUBLICATIONS

S. Young, "Detecting Misrecoginitions and Out-of-Vocabulary Words", 1994, IEEE.*
Chelba, C. et al., "Retrieval and Browsing of Spoken Content," IEEE Signal Processing Magazine, Oct. 15, 2007, pp. 1-20.
Yu, R.P. et al., "Word-Lattice Based Spoken-Document Indexing with Standard Text Indexers," SIGIR '08, Jul. 20-24, 2008, pp. 1-8.

* cited by examiner

*Primary Examiner* — Apu Mofiz
*Assistant Examiner* — Sheryl Holland
(74) *Attorney, Agent, or Firm* — Pearl Cohen Zedek Latzer Baratz LLP

(57) ABSTRACT

A system and method for receiving an initial search entry to search text data. The text data may be, for example, an N word lattice, transcribed by a text to speech engine. The difference between the initial search entry and one or more entries in the dictionary may be measured. One or more similar entries may be selected from the dictionary that have the smallest measures of difference to the initial search entry. The text data may be searched for the one or more selected similar entries. Each of the searched similar entries found in the text data may be displayed as a search result.

14 Claims, 7 Drawing Sheets

SYSTEM AND METHOD FOR FLEXIBLE SPEECH TO TEXT SEARCH MECHANISM

BACKGROUND

Speech to text (STT) mechanisms may automatically transcribe audio or speech data to text data. Text data is often preferred over audio data since it is searchable and relatively easy to review. Furthermore, text data is exact, whereas human speech samples are often uncertain based on inconsistencies in the human voice. Accordingly, text data may be preferred to control automated mechanisms predictably and exactly.

Speech to text (STT) mechanisms typically use a dictionary or database of words, phonemes and phrases to convert speech data to text data. Some STT mechanisms are rigid and require transcribed speech data to exactly match an entry in the dictionary. Such an STT mechanism may only transcribe words already contained within the dictionary and may incorrectly transcribe or search for any words outside the dictionary, for example, slang words, esoteric words specific to a professional field, or words mumbled or spoken with an accent in an audio recording.

To solve this problem, some STT mechanisms search for "out of vocabulary" (OOV) words and phrases which are not contained in the dictionary. STT mechanisms may search for out of vocabulary words by expanding the STT dictionary. However, expanding the STT dictionary may increase memory resources and become cumbersome to search, for example, increasing search time.

Other STT mechanisms may only require search terms to approximately (not exactly) match dictionary entries. For example, only a sub-set of phonemes in a search word may match a dictionary entry to generate a positive search result. By lowering the standards for defining a match, such mechanisms often generate incorrect search results.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. Specific embodiments of the present invention will be described with reference to the following drawings, wherein:

Figure 1:
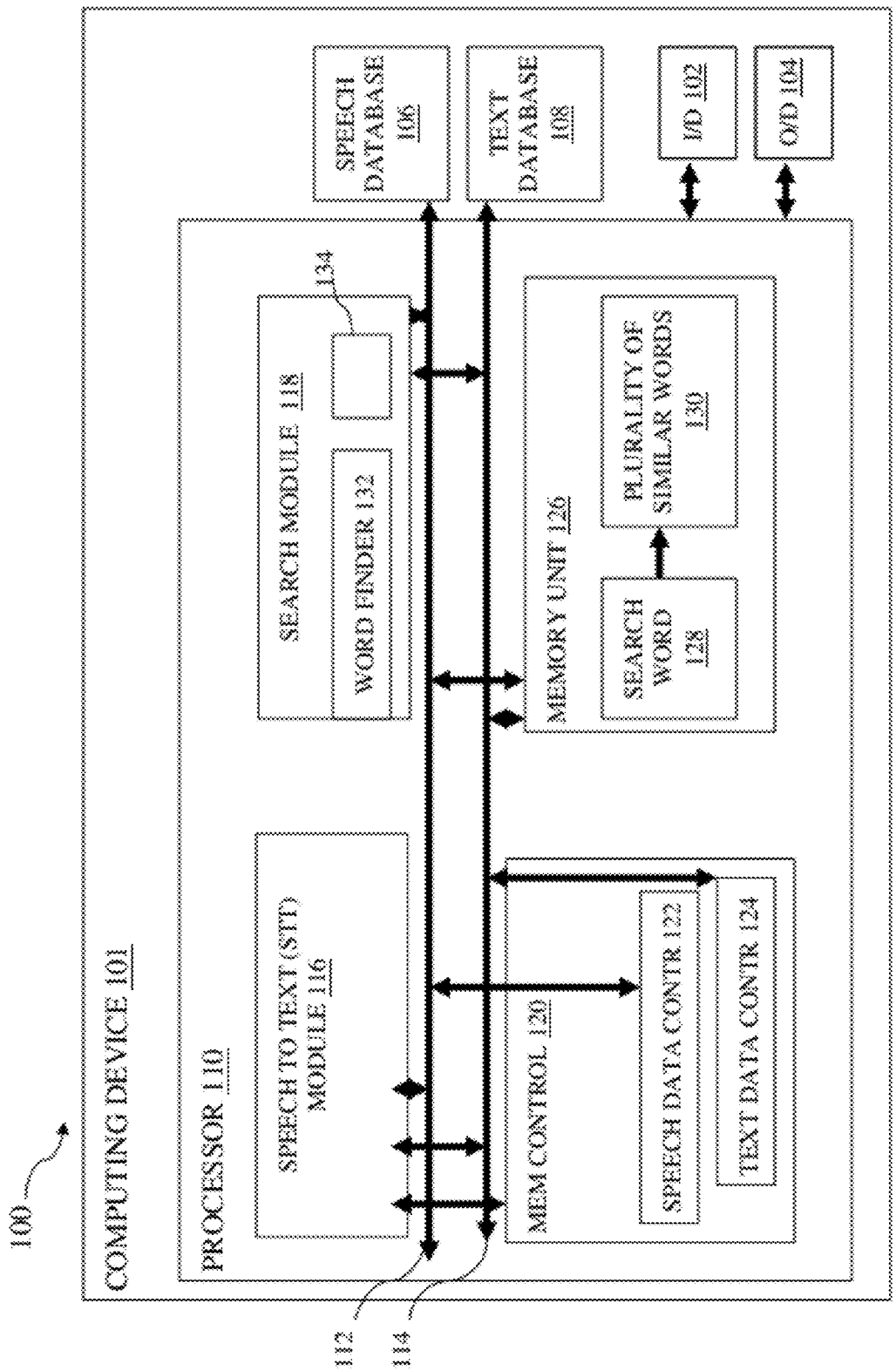
FIG. 1 is a schematic illustration of a system for executing a word search in accordance with embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In speech to text recognition, there may be inherent uncertainty in the output text data due to variations in voices, accents, mumbling, ambient noise, etc., in the input speech samples. Accordingly, words are often transcribed, not exactly, but with probabilities of occurring, for example, in a word lattice. A word lattice (of size N) may provide up to a plurality of (N) different possible words for each actual word spoke.

Conventional systems typically search for exact matches of a search term in text data. However, when searching text data (e.g., such as a word lattice) in which the words are themselves uncertain, exact searches may fail to exploit the variety of possible solutions.

Embodiments of the invention may exploit such variety by providing a system and method for executing a "fuzzy" or approximate search for a search entry in text data by searching the text data not only for the exact search entry, but also for a plurality of "close" or "similar" entries approximately matching the original search entry. The plurality of close words may be permutations of the original search term, e.g., substituting, adding or deleting letters.

The original search term may be an "out of vocabulary" (OOV) search entry (words, phonemes, or phrases) not found in a dictionary or an "in vocabulary" (IV) entry (words, phonemes, or phrases) found in the dictionary. The plurality of similar entries may be IV or dictionary words, phonemes, or phrases that have the smallest measures of difference between the dictionary entry and the original search entry. The plurality of similar entries may be ordered, weighted or identified by their level of closeness (or difference) to the original search words (e.g., the original search word having the greatest similarity, highest order and/or smallest (zero) measure of difference). The dictionary may be a database of words, for example, stored in a memory within the processor.

In one embodiment, the closeness of words may be measured by an "edit distance," such as for example, the Levenshtein distance. The edit distance between the original search entry and each similar entry may be a measure of the minimum number of letters added, deleted, or substituted to transform the words, phonemes or phrases of the dictionary entry into the words, phonemes or phrases of the original search entry. The smaller the edit distance, the closer the dictionary entry is to the original search entry.

In one embodiment, a predetermined number of similar entries may be selected from the dictionary, which are closest to (e.g., having the smallest edit distances from) the original search entry. In another embodiment, all dictionary entries sufficiently close to the original search term (e.g., within a predetermined maximum edit distance therefrom) may be selected as similar entries. The predetermined number of similar entries or maximum edit distance may be set manually by a programmer or automatically by a processor, for example, depending on the processing capacity or, in a multi-core processor, the number of available processing threads to search in parallel for the plurality of similar entries.

Once the plurality of similar entries are selected from the dictionary, a search mechanism may search for those words in the text document or database. In one embodiment, the search mechanism may search for all of the selected similar entries or only a sub-set of those similar entries. In one embodiment, the search mechanism may search for two or more of similar entries in parallel, for example, where each entry may be processed by a separate thread or core of a multi-core processor. In another embodiment, the search mechanism may search for the similar entries one at a time or in series, for example, in a sequential order of the edit distance of the similar entries from the entry with the smallest to the largest edit distances until one or more matches are found in the text data.

Search mechanisms according to embodiments of the invention may be "flexible" providing search results not only for words that are in the dictionary (IV words), but also for words that are not in the dictionary (OOV word) by using an extended set of similar words that are in the dictionary (IV). Search mechanisms according to embodiments of the invention may be referred to as "fuzzy" search mechanism since entries are searched for, that are similar to, but not exactly matching, the original recorded search terms.

Although embodiments of the invention are described for searching speech to text documents, such embodiments may be used to search any text data, document, database, word lattice or file, for example, for spell checking, grammar checking, auto-correction, predictive text, automatic transcription or translation, automated call center services, artificial intelligence speech engines, voice command recognition, interactive voice response, linguistic analysis engines, robotics, video games with voice activated operations, or any other system or method for searching or recognizing words, phrase or phonemes.

Reference is made to FIG. 1, which schematically illustrates a system 100 for searching for words in accordance with embodiments of the invention. System 100 may include one or more device(s) 101.

Device 101 may include, or may be part of, a personal computer, workstation, video or audio recording or playback device, cellular device, or any other digital device such as a cellular telephone, personal digital assistant (PDA), video game console, etc. Device 101 may include any device capable of executing a series of instructions to record, save, store, process, edit, transcribe, display, project, receive, transfer, or otherwise use or manipulate data, for example, text data such as word lattices or audio data such as speech samples.

Device 101 may include an input device 102. When device 101 includes recording capabilities, input device 102 may include an audio recording device including an audio recorder, a microphone, etc., to record an audio sample via the projection of sound waves thereto, for example, emitted by a human voice or an audio output device. When device 101 includes data processing capabilities, input device 102 may include a pointing device, click-wheel or mouse, keys, touch screen, recorder/microphone using voice recognition or text to speech capabilities, or other input components for a user to control, modify, or select text to speech processing operations.

Device 101 may include an output device 104 (for example, a monitor, projector, screen, printer, speakers, or display) for displaying transcribed audio data or search results on a user interface according to a sequence of instructions executed by processor 110.

Device 101 may include a processor 110, such as, a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multi-purpose or specific processor or controller. Processor 110 may be a single-core or multi-core processor. Processor 110 may include more than one processor or more than one processing cores.

Device 101 may include one or more memory or storage units, such as, a speech database 106, a text database 108, and an internal memory unit 126. Speech database 106 may store audio files, voice samples, etc., and may be an internal or external memory unit, such as a disk drive. The audio data may be recorded in any audio format and may be compressed or un-compressed. Text database 108 may store text data such as words, phonemes and phrase, dictionaries, word lattices, transcribed audio files, and word recognition or linguistic rules. In one embodiment, memory unit 126 may be an internal memory unit (inside or in direct communication with processor 110), while speech database 106 and text database 108 may be external memory units (external to processor 110). In other embodiments, any of these memory units may be internal or external memory units. Memory unit 126, speech database 106 and/or text database 108 may include, for example, random access memory (RAM), dynamic RAM (DRAM), flash memory, cache memory, volatile memory, non-volatile memory, one or more external drivers, such as, for example, a disk or tape drive or a memory in an external device such as the audio, and/or video recorder or other suitable memory units or storage units to store data generated by, input into or output from device 101.

Device 101 may include one or more memory controllers 120 to control the transfer of data into and out of units of system 100, such as processor 110, memory unit 126, and input/output device 102,104. Memory controller 120 may include a speech data controller 122 to control the transfer of data into and out of speech database 106 via a data bus 112 and may include a text data controller 124 to control the transfer of data into and out of text database 108 via a data bus 114.

Device 101 may include a speech to text (STT) module 116. STT module 116 may include hardware, for example, a sequence of logic units or software, for example, a program including a sequence of instructions, which when executed accept audio data and convert or transcribe the audio data into text data.

STT module 116 may receive audio data from speech database 106, for example, as pre-recorded files, or from input device 102, such as, a microphone, for example, for real time transcription. STT module 116 may output converted text data, for example an N-word lattice (e.g., word lattice 600 of FIG. 6), and save the text data to text database 108 or memory unit 126.

Device 101 may include a search module 118 to search text database 108 for a search entry 128. Search entry 128 may include one or more words, phonemes, phrases or any combination thereof. Search entry 128 may be entered by a user to search a document, for example, after it is already transcribed or may be entered automatically by processor 110 as part of the transcription process. A word finder 132 or "fuzzy phrase finder" (e.g., part of or separate from search module 118) may select a plurality of close or similar entries 130 from the dictionary, for example, which are the closest to (e.g., have the smallest edit distances from) original search entry 128. Search module 118 may execute a "fuzzy" or "flexible" search, for example, searching not only for search entry 128, but also for (a predetermined number of) similar entries 130. Similar entries 130 may be permutations of original search entry 128 found in the dictionary, for example, including additions, deletions, substitutions or any other reorganizations of the letters in original search entry 128. Accordingly, even if original search entry 128 is an OOV word or not correctly transcribed by STT module 116, for example, due to improper annunciation, mumbling or an error in the recorded audio sample, search module 118 may generate and search for alternative similar entries 130 to find the correct transcription for the misspoken words among a variety of search solutions.

In one embodiment, search module 118 may only record exact matches of search entry 128 and similar entries 130 to entries in the text database 108. In another embodiment, search module 118 may record inexact or approximate matches, for example, when the similar entries 130 are similar (e.g., less than a predetermined edit distance) to entries in the text database 108.

Search module 118 may generate search results for entries in text database 108 that match search entry 128 and/or one or more similar entries 130. These matching entries (words, phonemes or phrases) in text database 108 may be, for example, provided in a list, highlighted in a text document being searched, retrieved, marked, flagged, tagged, labeled, or otherwise indicated as search results. Output device 104 may display the search results on a user interface. In some embodiments, a user may select (e.g., via input device 102) one or more of the search results, for example, to verify a result or to select a correct result from among a plurality of results.

Processor 110 may perform operations according to embodiments of the invention by executing, for example, code or instructions stored in memory unit 126, speech database 106 or text database 108.

Figure 2:
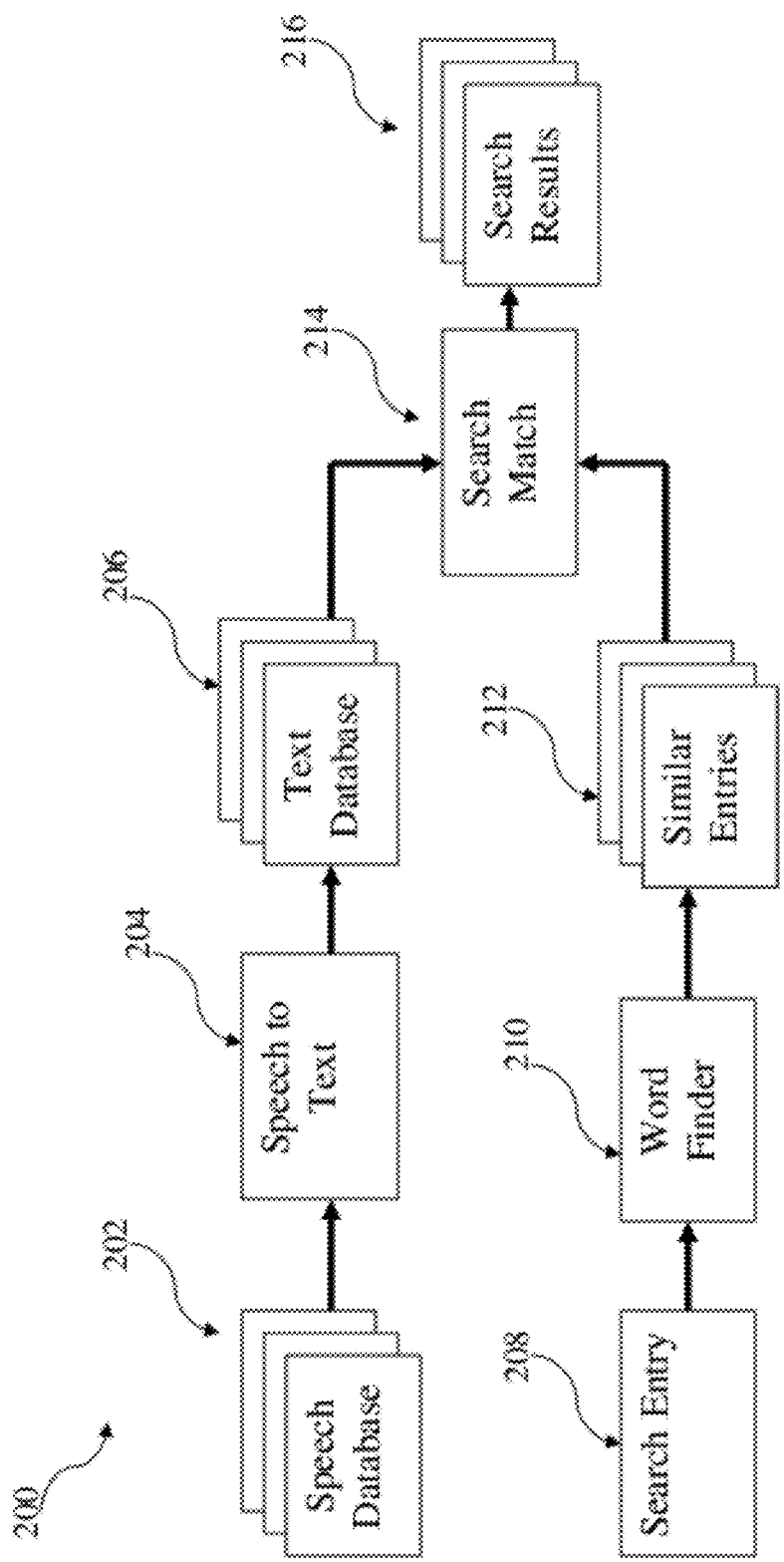
FIG. 2 is a schematic illustration of a system workflow for executing a word search, in accordance with embodiments of the invention.

Reference is made to FIG. 2, which schematically illustrates a workflow 200 for executing a word search in accordance with embodiments of the invention. A system may include or use components of system 100 such as device 101 and processor 110 of FIG. 1 to implement the workflow 200 of FIG. 2.

The system may include a speech database, a speech to text (STT) module, a text database, a search entry, a word finder, a plurality of similar entries, a search module, and search results for executing workflow 200.

In operation 202, the speech database (e.g., speech database 106 of FIG. 1) may provide an audio file or speech sample to input into the STT module. The audio file may include a set of search calls and/or interactions, for example, search calls from customer telephone calls with agents at a call center (or contact centers) and/or agent-customer interactions.

In operation 204, the STT module (e.g., STT module 116 of FIG. 1) may receive the audio file (e.g., or segments or parts of the audio file) from the speech database and may convert speech in the audio files into words, phonemes or phrases in a text file or word lattice.

In operation 206, the text database (e.g., text database 108 of FIG. 1) may store the converted text output from the STT module. The text database may transfer the converted text data to the search module. The text data may be stored, for example, as an N-word lattice (e.g., word lattice 600 of FIG. 6).

In operation 208, the search entry (e.g., search entry 128 of FIG. 1) may include words, phonemes or phrases to be searched. Search entry may include OOV or IV words or phrases and may be the input to the search system.

In operation 210, the word finder (e.g., word finder 132 of FIG. 1) may input the search entry.

In operation 212, the word finder may select a plurality of similar entries (e.g., similar entries 130 of FIG. 1) from the dictionary, for example, which have the relatively smallest edit distances to the original search entry. Similar entries may include permutations of the original search entry, for example, generated by rearranging, adding or deleting letters to and from search entry. Similar entries, approximating the original search entry, may be used for an approximate or "fuzzy" search of the text database.

In operation 214, the search module (e.g., search module 118 of FIG. 1) may search for the original search entry and/or similar entries in the text database (e.g., an N-word lattice). The search module may search for entries in the text database that exactly match the original search entry and/or the similar entries. Alternatively, the search module may search for inexact or approximate matches, for example, including rhyming words or words matching a sub-set of words or phonemes.

In operation 216, search results (e.g., stored in memory unit 126 and output by output device 104 of FIG. 1) may include text objects (e.g., words, phonemes, phrases, punctuations) in the text database matching the original search entry and/or similar entries. Search results may include a listing, marking, highlighting or other indication of each of the matching text objects. Search results may be ordered or sorted by their closeness to the original search entry. The closeness may be measured by an edit distance, for example, described in further detail in reference to FIG. 4.

Figure 3:
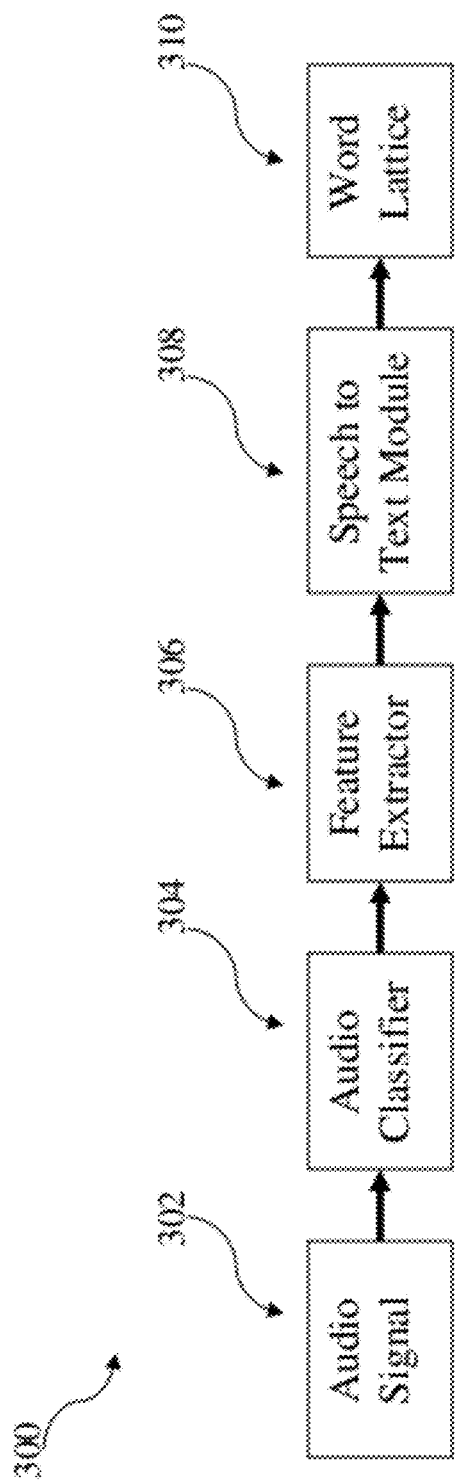
FIG. 3 is a schematic illustration of a system workflow for converting speech data to text data, in accordance with embodiments of the invention.

Reference is made to FIG. 3, which schematically illustrates a workflow 300 for converting speech to text in accordance with embodiments of the invention. A system may include or use components of system 100 such as such as device 101 and processor 110 to implement workflow 300 of FIG. 3.

The system may include an audio signal, an audio classifier, a feature extractor, a speech to text (STT) module, and a word lattice for executing workflow 300.

In operation 302, the processor may receive an audio signal. The audio signal may include any sound or audio signals, waves, or files. The audio signal may have any format, for example, way, mpc, raw, etc. The audio signal may be provided via an input device (e.g., input device 102 of FIG. 1) such as a microphone or amplifier or may be a pre-recorded sounds sample transferred via a disk drive or memory unit (e.g., speech database 106 of FIG. 1).

In operation 304, the audio classifier may separate the audio signal into different categories of sound, for example, speech, music, noise, etc. The audio classifier may include sound filters to extract parts of the audio signal relating to speech or voice patterns and removing parts of the audio signal relating to other sounds, e.g., music, noise, static, etc.

In operation 306, the feature extractor may extract features from the speech portions of the audio signal, for example, Mel Frequency Cepstral coefficients (MFCC), RASTA-PLP, Linear Predictive Coefficients (LPC), rhythm, stress, intonation of speech, syllable length, vowel length, loudness, pitch, and the formant frequencies of speech sounds, speech patterns, phonology, prosody, etc. These features, present in spoken language, but not in written language, may be represented by written markers such as punctuations (e.g., commas, periods, colon/semi-colon, exclamation marks, question marks, quotations marks, and ellipses) or typographic effects for emphasis (e.g., italic, bold, and underlined text).

In operation 308, the STT module (e.g., STT module 116 of FIG. 1) may convert the extracted speech portions and features of the audio signal to text, e.g., including words, punctuation and typographic effects.

Figure 5:
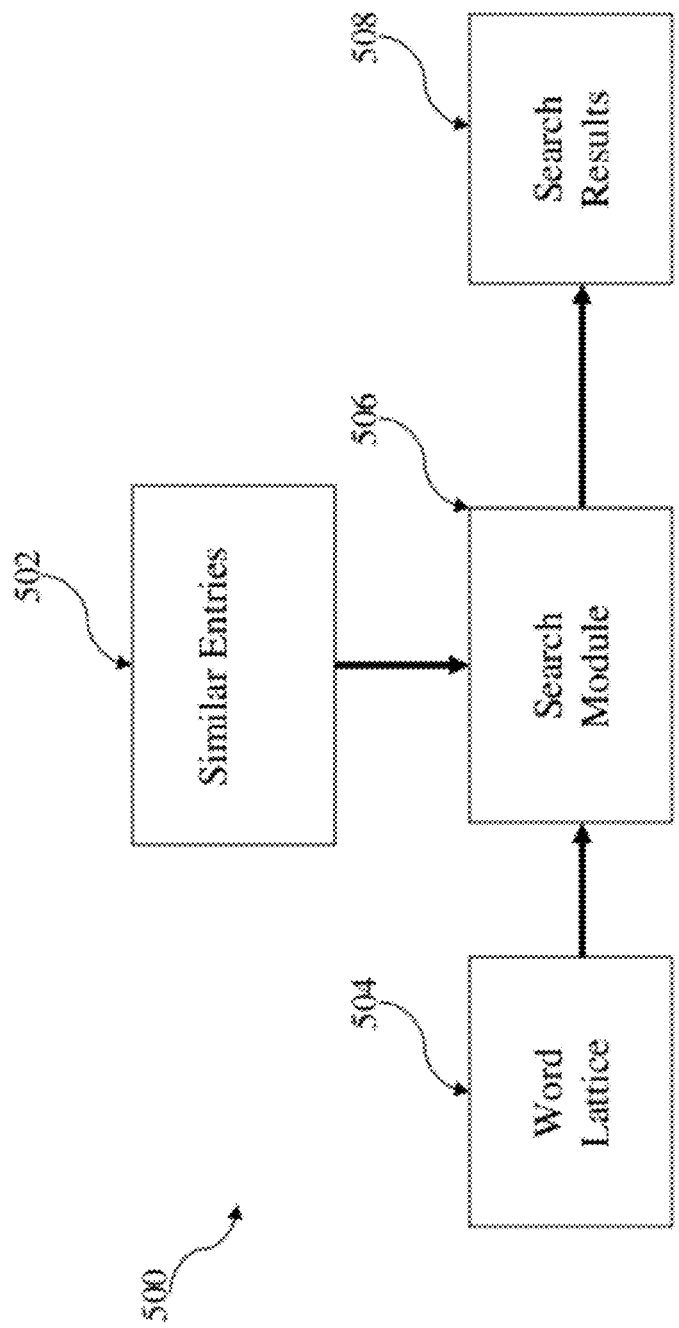
FIG. 5 is a schematic illustration of a system workflow to search for executing a word search, in accordance with embodiments of the invention.
Figure 6:
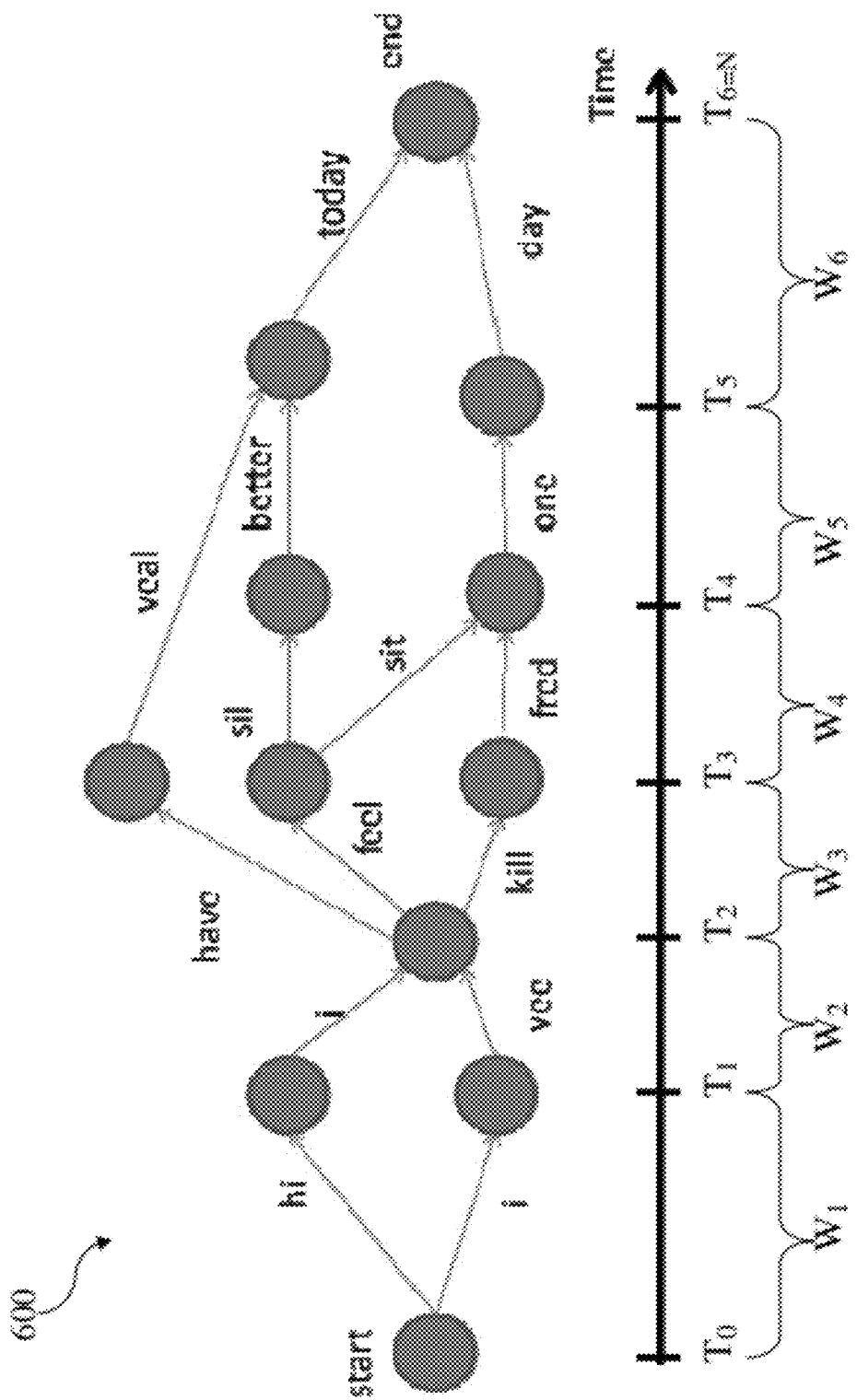
FIG. 6 is a schematic illustration of a word lattice, in accordance with embodiments of the invention.

In operation 310, the STT module may generate a word tree or lattice (e.g., word lattice 600 of FIG. 6). The word lattice may represent each of a plurality of different possible transcriptions by each path through the word lattice moving forward in time. During each word interval there may be a plurality of different possible words, which may be listed in parallel in the word lattice. Each parallel word in a word interval may have a (different or equal) positive probability of being spoken at that interval of time. The number of parallel words may be less than or equal to a maximum predetermined number of words, N, to generate a word lattice of size N (e.g., N is 3 in FIG. 6). Each path through the word lattice may provide a different combination of a linear sequence of words. The word lattice may be a text document (e.g., stored in text database 108 of FIG. 1). The word lattice may be searched for the original search entry and a corresponding set of the closest or most similar search entries or words found in the dictionary (e.g., as described in reference to FIGS. 4 and 5).

Figure 4:
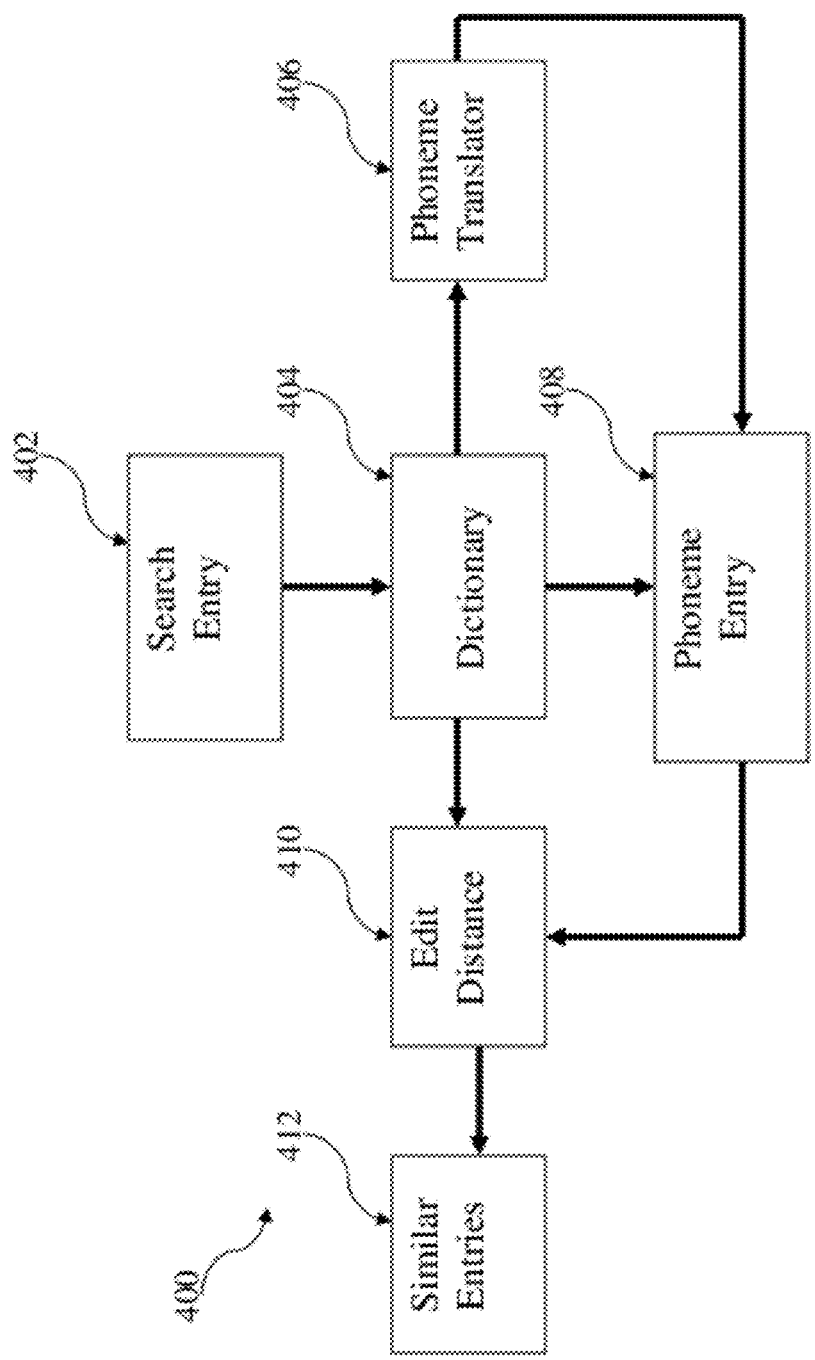
FIG. 4 is a schematic illustration of a system workflow for retrieving a plurality of similar search entries for each single search entry input into a word search, in accordance with embodiments of the invention.

Reference is made to FIG. 4, which schematically illustrates workflow 400 for retrieving a plurality of similar search entries for each single search entry input into a word search in accordance with embodiments of the invention. The plurality of similar search entries may provide a plurality of approximate searches adapted to search a word lattice having a plurality of parallel probable words. The approximate or "fuzzy" search may be flexible providing search results for both an in vocabulary (IV) and out of vocabulary (OOV) original search entry. A system may include or use components of system 100 such as such as device 101 and processor 110 to implement the workflow 400 of FIG. 4.

The system may include a search entry, dictionary, and search module for executing workflow 400.

In operation 402, the original search entry (e.g., search entry 128 of FIG. 1) may include one or more words, phonemes, phrases (e.g., provided via input device 102 of FIG. 1).

In operation 404, the search module (e.g., search module 118 of FIG. 1) may input the original search entry into the dictionary. In some embodiments, multiple word dictionaries may be used. For example, a primary (basic) dictionary may be searched first, after which if no match is found a secondary dictionary may be used, such as one, with more or different words, specific to a field, or for another language. The one or more dictionaries may have the phonetic translations of each word therein.

In operation 406, if the original search entry is an (OOV) word not found in the dictionary, a phonetic translator or text to phoneme (TTP) translator (e.g., phonetic translator 134 of FIG. 1) may convert the original search entry into a set of equivalent phonemes. The phoneme translator may use phonetic rules to convert the search entry into a phoneme entry (e.g., a sequence of corresponding phonemes).

In operation 408, if the original search entry is an (IV) word found in the dictionary, the search module may retrieve the phonetic translation of the search entry from the dictionary. Phonemes may be stored in the dictionary or in a separate phoneme dictionary or look-up table (e.g., linked to their corresponding word(s)).

In operation 410, the processor may calculate an edit distance between the original search entry and each of one or more (e.g., all) entries (words or portions or combinations of words) in the dictionary. The edit distance may be a measure of the difference between the phoneme entry of the original search word and the phonemes of each dictionary entry. The edit distance (e.g., Levenshtein distance) between two sequences of phonemes (e.g., of the original search entry and each dictionary entry) may be the minimum number of edits needed to transform one string of phonemes into the other, where an insertion, deletion, substitution and/or rearrangement of a single phoneme may each count as a single edit operation.

In operation 412, the similar search entries (e.g., similar entries 130 of FIG. 1) may be the sequences of phonemes in the dictionary with the smallest edit distances to the phonemes of the original search entry. In one embodiment, a predetermined number, R, of sequences of phonemes may be selected from the dictionary providing a fixed number of similar search entries for each search or original search entry. In another embodiment, a variable number of similar search entries may be generated that are all within a fixed maximum edit distance from the phonemes of the original search entry.

It may be appreciated that although the edit distance is described here to be a measure of the difference between words or phonemes, this measure may be equivalent to (e.g., the inverse of) a measure of the similarity or closeness between words or phonemes. For example, the edit distance may measure the number of equivalent letters between the entries.

Reference is made to FIG. 5, which schematically illustrates a workflow 500 for executing a word search of similar entries in accordance with embodiments of the invention. Searching for words that are similar to an original search may enable flexible or approximate searching. A system may include or use components of system 100 such as such as device 101 and processor 110 to implement the workflow 500 of FIG. 5.

The system may include similar search entries, a search module, and a word lattice, for executing workflow 500.

In operation 502, the processor may retrieve a plurality of similar search entries and corresponding phonemes (e.g., similar entries 130 of FIG. 1 retrieved according to embodiments described in reference to FIG. 4). The processor may retrieve entries and/or corresponding phonemes from a dictionary having the relatively smallest edit distances from the original search term as compared to other entries in the dictionary. The processor may retrieve a predetermined number of (e.g., R) similar search entries and/or phonemes from the dictionary. Similar search entries or phonemes may include the original search entry and/or phonemes, which may have the smallest edit distance (e.g., zero) from itself.

In operation 504, the processor may retrieve a word lattice (e.g., word lattice 600 of FIG. 6) to be searched. The word lattice may have a plurality of up to (e.g., N) parallel entries.

In operation 506, the search module (e.g., search module 118 of FIG. 1) may input the word lattice and the plurality of similar search entries and/or their corresponding phonemes for searching the word lattice. In one example, the search module may search for each of a plurality of (R) similar search entries in word lattice of (N) parallel entries.

In operation 506, the search module may generate one or more search results. Search results may include all exact (or inexact) matches between entries in the word lattice and at least one of similar search entries. Each entry in the word lattice matching a similar search entry may be close to, but not exactly matching, the original recorded search entry, to generate approximate or fuzzy search results.

Reference is made to FIG. 6, which schematically illustrates a word lattice 600 in accordance with embodiments of the invention.

Word lattice 600 may be a word lattice or tree representing audio data, for example, converted by a speech to text module (e.g., STT module 116 of FIG. 1). Word lattice 600 may include a network of words or phonemes inter-connected in different paths, where each path represents a different possible transcription of the audio data. For each period of time during which a speech signal spikes in an audio file (e.g., word interval Wi, from time Ti−1 to Ti) one or more words may be transcribed. When a single correct word is unknown, a plurality of possible words may be transcribed for the same word interval (e.g., listed in parallel in the word interval). The number of words transcribed in parallel and thus the size of word lattice 600 may be less than or equal to a predetermined maximum number, N (e.g., three in FIG. 6). Each path through word lattice 600 may provide at least one different word to generate different combinations with each of the parallel words in each word interval.

In one example, a search entry, e.g., "veal," may be searched for in word lattice 600. A dictionary may be provided, for example, as follows:

| Word | Phonetic translation |
|---|---|
| veal | v i l= |
| appeal | @ p i l= |
| vee | v i |
| vegan | v i g n= |
| better | b e t @ |
| sit | s I t |
| today | t @ d eI |
| i | aI |
| hi | h aI |
| one | w V n |
| will | w I l |
| kill | k I l |
| have | h { v |
| feel | f i l= |
| fred | f r e d |
| day | d eI |

The original search entry (e.g., veal) may be searched for in the dictionary. If the search entry is found in the dictionary (e.g., row 1 in the table above), the phonetic translation or phonemes of the entry may be provided as a similar search entry. However, if the search entry is not found in the dictionary (e.g., row 1 is deleted in the table above), a phonetic translator (e.g., phonetic translator 134 of FIG. 1) may generate the phonemes of the entry. In this example, the search entry, veal, is found in the dictionary and the phonetic conversion thereof, v i l=, is provided by the dictionary.

The edit distance may be calculated between the phonetic translation of the search word, v i l=, and the phonetic translation of each term (or a subset of terms) in the dictionary. The edit distance may measure the minimum number of operations (e.g., insertion, deletion, or substitution of a single phoneme) to convert the phonemes of the search entry to the phonemes of each dictionary entry. Each operation (e.g., insertion, deletion, or substitution) adds one unit to the edit distance (e.g., an exact match for each letter contributes an edit distance of 0). In another embodiment, different edit operations may add different weights or units to the edit distance.

In one example, to compare the phoneme translations v i l=, for veal and v i g n= for vegan, a dictionary entry, the minimum number of edits may be calculated to transform one string into the other. The following table shows a plurality of permutations used to transform one string into the other. The permutation with the smallest values may be used to calculate the edit distance:

|   | v | i | l= |
|---|---|---|---|
| v | 0 | 1 | 2 |
| i | 1 | 0 | 1 |
| g | 2 | 1 | 1 |
| n= | 3 | 2 | 2 |

The edit distance to transform the search word phonemes (v i l=) to the dictionary phonemes (v i g n=) is two (e.g., one to substitute g for l= and one to insert n=). These calculations may be repeated to calculate the edit distance between phonemes of the original search entry (v i l=) and phonemes of each word (or a set of words) in the dictionary. The dictionary words may be sorted based on their edit distances, for example, as follows (from lowest to highest).

| Word | Edit Distance |
|---|---|
| veal | 0 |
| vee | 1 |
| feel | 1 |
| appeal | 2 |
| vegan | 3 |
| sit | 3 |
| i | 3 |
| hi | 3 |
| one | 3 |
| will | 3 |
| kill | 3 |
| have | 3 |
| day | 3 |
| better | 4 |
| today | 4 |
| fred | 4 |

Embodiments of the invention may search for a predetermined number, R, of similar search entries for each original search entry. The predetermined number may be for example, R=3. It may be appreciated that in the table above, the original search entry (veal) is included as one of the similar search entries (e.g., having the minimum (0) edit distance). In other embodiments, the original search entry may always be searched for first, after which the similar search terms may only be searched if the original search entry has no match in the word lattice.

Embodiments of the invention may search word lattice 600 for the predetermined number of (e.g., three) dictionary words, for example, selected in the order in which they are sorted (e.g., the first word having the smallest edit distance to the original search word). In one example, the first three sorted dictionary words in the table provided are veal, vee and feel. The search module may search word lattice 600 for each of these similar search entries.

For each similar search entry found in word lattice 600, the search module may generate a search result including the matched word and, for example, a certainty score. The certainty score for a matching similar search result may be a measure of the certainty that that entry was actually spoken in the audio data transcribed as word lattice 600. The certainty score may be an amount decreased by the entry's edit difference. In one example, the certainty score for a matching similar search result may be, for example, a first predetermined amount (A) or percentage (100%) less a second predetermined amount (B) or percentage (10%) times the edit distance from that similar search result to the original search word. For example, since veal has an edit distance of zero (0), no percentage is subtracted and the certainty for the veal search result is, for example, 100%. The word vee has an edit distance of one (1) and thus, 10% of the certainty score is subtracted, providing a 90% certainty for the vee search result. The word fred has an edit distance of four (4) and thus a certainty of 60%.

Other measures for edit distance and certainty for search results may be used.

Figure 7:
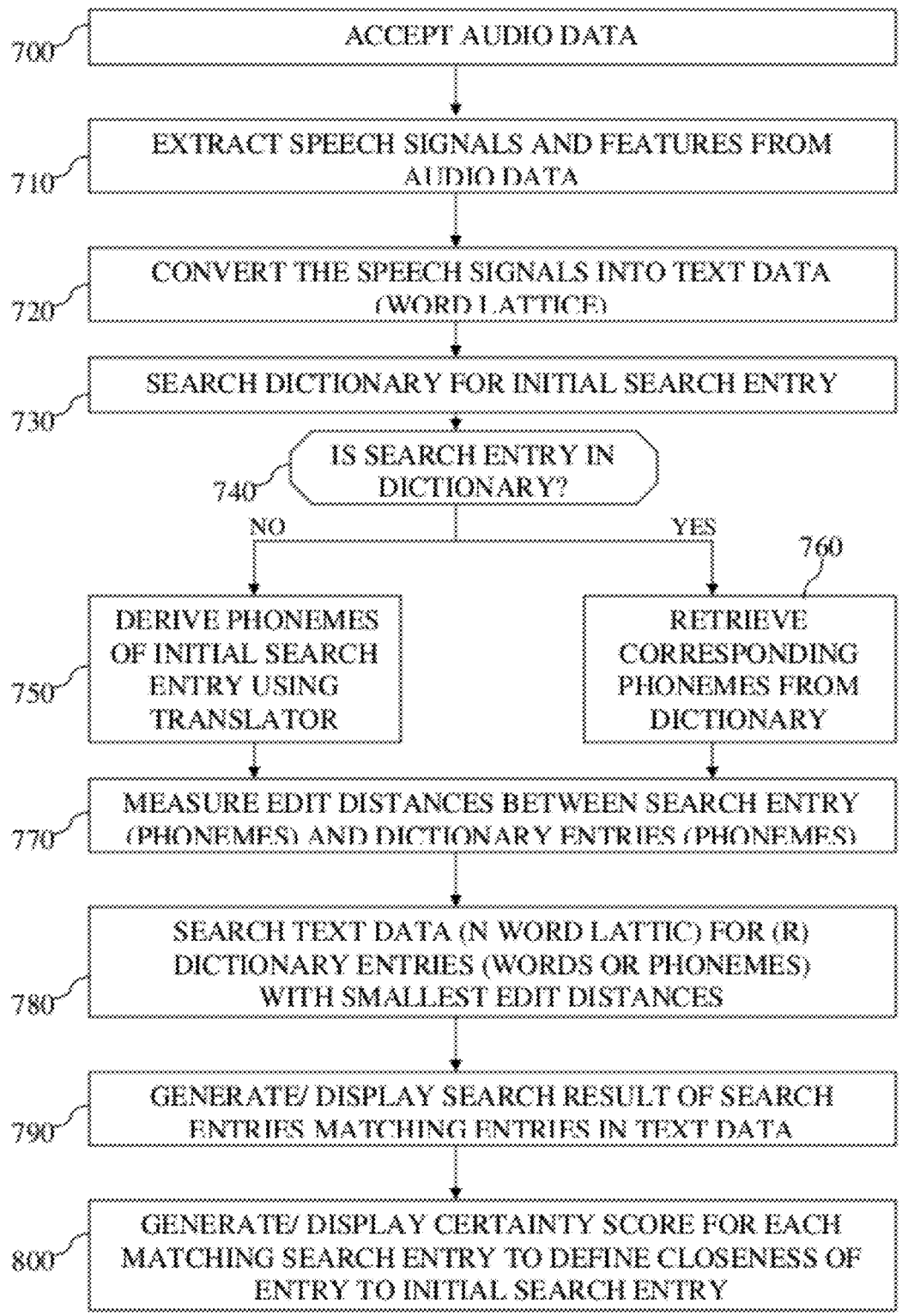
FIG. 7 is a flowchart of a method for executing a word search in accordance with embodiments of the invention.

Reference is made to FIG. 7, which is a flowchart of a method for executing a word search in accordance with embodiments of the invention.

In operation 700, an input device (e.g., input device 102 of FIG. 1) may accept audio data (e.g., a speech sample/voice recording). The audio data may be stored in a speech database (e.g., in speech database 106 of FIG. 1).

In operation 710, an audio filter (e.g., audio classifier 304 and feature extractor 306 of FIG. 3) may extract speech signals from the audio data and speech features from the speech signals, for example, MFCC, RASTA-PLP, LPC, rhythm, stress, intonation of speech, etc.

In operation 720, a speech to text engine (e.g., STT module 116 of FIG. 1) may retrieve and convert the speech signals into text data. For example, spoken words may be converted into phonemes, words and/or phrases and speech features such as MFCC, RASTA-PLP, LPC, rhythm, stress, and intonation, may be converted into punctuations and/or typographic effects. The text data may be a word lattice (e.g., N word lattice 600 of FIG. 6), a table, a document, a text file, or any other word structure. The text data may be stored in a text database (e.g., in text database 108 of FIG. 1).

In operation 730, a search engine (e.g., search module 118 of FIG. 1) may search a dictionary (e.g., dictionary 404 of FIG. 4) for an initial search entry (e.g., search entry 128 of FIG. 1). The initial search entry may include words and/or phrases and may be entered manually by a user (e.g., via the input device) or automatically by a processor (e.g., processor 110 of FIG. 1), for example, for interactive voice response, auto-spell checking, auto-translation, predictive text, etc. The dictionary may also include the phonetic translations of each of the entries stored therein.

In operation 740, the search engine may determine if the initial search entry is in the dictionary (IV) or not in the dictionary (OOV). If the initial search entry is in the dictionary, a process or processor may proceed to operation 760. However, if the initial search entry is not found in the dictionary, a process or processor may proceed to operation 750.

In operation 750, the search engine (e.g., using phonetic translator 134 of FIG. 1) may translate or derive the phonemes of the initial search entry, for example, from scratch.

In operation 760, the search engine may retrieve the already generated phonetic translation of the initial search entry from the dictionary.

In operation 770, the search engine may measure an edit distance between the initial search entry (e.g., or phonemes thereof) and the dictionary entries (e.g., or phonemes thereof). The plurality of dictionary entries may be ordered, ranked or scored based on their similarity (or differences) to the initial search entry. For example, the similar search entries with a smaller edit distance to the original search entry may have a relatively higher order.

In operation 780, the search engine may search the text data for the dictionary entries having the smallest differences, for example, as a plurality of similar search entries (e.g., similar entries 130 of FIG. 1). The search engine may search for a predetermined number of (R) similar search entries having the highest ordering in a word lattice of up to (N) parallel words. In one embodiment, the search engine may generate and search for similar search entries in one by one or in sets of a predetermined number (e.g., 1, 2, 3, . . . , 10). A new set of similar entries may be generated and searched for only after the previous set is not found.

The search engine may search for the plurality of similar search entries, for example, one at a time (sequentially from the closest to the most different of the similar entries) or two or more at a time (in parallel). In one embodiment, the search engine may search for all or only a subset of the similar search entries. For example, the search engine may stop searching for similar search entries when a predetermined one or more of the plurality of similar search entries are found in the text data.

In some embodiments, the search engine may only record exact matches of similar search entries to entries in the text data. In another embodiment, the search engine may also record inexact or approximate matches, for example, when the similar search entries are themselves similar to the entries in the text data (e.g., less than a predetermined edit distance therefrom). When exact matches are used there may be one level of approximation, for example, where the similar entries approximate the initial search entry, while when inexact matches are used there may be an additional level of approximation, for example, where matching entries in the text data also approximate the similar entries. To limit search results from diverging too far from the original search term, exact matches may be used or when inexact matches are used, fewer similar entries (R) may be selected from the dictionary, which are closest to initial search entry.

In operation 790, a processor (e.g., processor 110 of FIG. 1) may generate and display a search result (e.g., search result 216 of FIG. 2 displayed on output device 104 of FIG. 1). Search results may include any initial or similar search entry matching an entry in text data. The matching entries may be highlighted, for example, in a document or word lattice of text database, or may be listed, for example, in a table in the order of the edit distance of the entry to the initial search entry from smallest to largest.

In operation 800, the processor may generate and/or display (e.g., in output device 104 of FIG. 1) a certainty score for each matching search entry to define the certainty or confidence that the entry is in the text data or was actually spoken in the converted audio data. The certainty score for each matching search entry may be decremented by or inversely proportional to the edit distance or difference from the initial search entry. For example, the certainty score for each matching search entry may be equal to 100%-(E10%) or $$\frac{100\%}{E},$$

where E is the edit distance to convert the entry to the original search entry. It may be noted that the certainty score of $$\frac{100\%}{E}$$

may be used to score similar entries, but not the initial entry with an edit distance of zero, for which the equation is undefined. Certainty scores may be part of the search result, for example, displayed together with their corresponding matching search entries, or alternatively, may be displayed separately.

Other operations of orders of operations may be used. In one embodiment, although the edit distances and similar entries are described here to be generated using phonemes, it may be appreciated that these data structures may be equivalently generated using complete words and/or phrases. If complete words and/or phrases are used instead of phonemes, operations 730-760 may be skipped.

According to embodiments of the invention, similar entries are automatically searched along with the initial search entry, regardless of whether or not the original search entry is IV (in the dictionary) or OOV (not in the dictionary). The original and similar entries may be ordered by closeness with the original search entry having a highest level of closeness (e.g., 100%) or smallest edit distance (e.g., zero). In other embodiments, a "fuzzy" search (e.g., searching for similar entries) may only used for OOV original search entries. For example, the original search entry may initially be searched for in the dictionary and only after receiving a negative search result (e.g., indicating the original search entry is an OOV word or phrase) does the search mechanism generate and search for the set of similar words. Since the text data is generated using the dictionary terms, once the original search entry is not found in the dictionary, the original search entry will also not be found in the text data and a separate search of the text data is typically not needed.

Embodiments of the invention described hereinabove may include an article such as a computer or processor readable medium, or a computer or processor storage medium, such as for example a memory, a disk drive, or a USB flash memory, for encoding, including or storing instructions which when executed by a processor or controller (for example, processor 110 of FIG. 1), carry out methods disclosed herein.

Although the particular embodiments shown and described above will prove to be useful for the many distribution systems to which the present invention pertains, further modifications of the present invention will occur to persons skilled in the art. All such modifications are deemed to be within the scope and spirit of the present invention as defined by the appended claims.

The invention claimed is:

1. A method comprising, using a processor:
receiving text data converted from speech data, wherein the text data is a word lattice transcribing up to a predetermined multiple number of different possible words for each spoken word interval of the speech data;
receiving a single initial search entry comprising one or more phonemes translated from speech data;
in a first search, searching for the initial search entry in a first data structure, the first data structure comprising two or more entries, each entry comprising one or more phonemes, measuring an edit distance between the phonemes of the initial search entry and phonemes of each of a plurality of entries in the first data structure, and selecting by a processor a predetermined multiple number of similar entries from the first data structure that have the smallest edit distances;
in a second search, using the predetermined multiple number of similar entries from the first data structure output by the first search as one or more inputs for the second search, and searching in the second search the word lattice for the predetermined multiple number of selected similar entries from the first search; and
after the second search, displaying, as a search result, a plurality of possible words transcribed for a spoken word interval of the speech data which are found to match in the word lattice.

2. The method of claim 1, wherein the edit distance between each first data structure entry and the initial search entry is the minimum number of letters added, deleted, or substituted to transform the phonemes of the first data structure entry into the phonemes of the initial search entry.

3. The method of claim 1, wherein a sub-set of the selected similar first data structure entries are searched for in the word lattice until a predetermined one or more of the searched similar first data structure entries are found in the word lattice.

4. The method of claim 1 comprising generating a certainty value for each of the similar entries found in the word lattice, wherein the certainty value for each found similar entry is decremented by the measure of the difference between the found similar entry and the initial search entry.

5. The method of claim 1, wherein the word lattice comprises text data which is converted from audio data by a speech to text engine.

6. The method of claim 1, wherein the predetermined multiple number of similar entries are searched for in parallel.

7. The method of claim 1, wherein each of the predetermined multiple number of similar entries is searched for separately in a sequential order from the entry with the smallest edit distance until a match is found in the word lattice.

8. The method of claim 1, wherein a first predetermined number (R) of similar entries are used to search a word lattice having up to a second predetermined number (N) of possible words for each interval.

9. The method of claim 1, wherein searching for the multiple selected similar entries provides a fuzzy search of the word lattice.

10. The method of claim 1, wherein the first data structure is dictionary.

11. A system comprising:
a processor configured to:
receive text data converted from speech data, wherein the text data is a word lattice transcribing up to a predetermined multiple number of different possible words for each spoken word interval of the speech data,
receive an initial search entry comprising one or more phonemes translated from speech data,
in a first search, search for the initial search entry in a first data structure, the first data structure comprising two or more entries, each entry comprising one or more phonemes, measure an edit distance between the initial search entry and each of the two or more entries in the first data structure to be a measure of a minimum number of operations used to transform phonemes in the initial search entry to phonemes in the entry in the first data structure, and select two or more similar entries from the first data structure that have the smallest edit distance to the initial search entry, in a second search, use the two or more similar entries output by the first search as one or more inputs for the second search, and search a word lattice for the two or more selected similar entries from the first search; and an output device to display as a search result, after the second search of the word lattice, a plurality of possible words transcribed for a spoken word interval of the speech data which are found to match in the word lattice.

12. The system of claim 11, comprising a speech to text engine to convert audio data to generate text data stored in the word lattice.

13. The system of claim 11, wherein the processor is to measure the edit distance between each first data structure entry and the initial search entry to be the minimum number of letters added, deleted, or substituted to transform the phonemes of the first data structure entry into the phonemes of the initial search entry.

14. The system of claim 11, wherein the processor is a multi-core processor configured to search each of the two or more similar entries in parallel.

* * * * *